(12) United States Patent
Manes (10) Patent No.: US 9,316,803 B2
(45) Date of Patent: Apr. 19, 2016

(54) EFFICIENT FIBER USAGE WITHIN PRE-TERMINATED FIBER DEVICES

(71) Applicant: Leviton Manufacturing Co., Inc., Melville, NY (US)

(72) Inventor: Dennis Lloyd Manes, Mill Creek, WA (US)

(73) Assignee: LEVITON MANUFACTURING CO., INC., Melville, NY (US)

(*) Notice: Subject to any disclaimer, the term of this patent is extended or adjusted under 35 U.S.C. 154(b) by 140 days.

(21) Appl. No.: 14/208,652

(22) Filed: Mar. 13, 2014

(65) Prior Publication Data

US 2014/0270636 A1    Sep. 18, 2014

Related U.S. Application Data

(60) Provisional application No. 61/793,692, filed on Mar. 15, 2013.

(51) Int. Cl.
*G02B 6/38* (2006.01)
*G02B 6/44* (2006.01)

(52) U.S. Cl.
CPC ............ *G02B 6/4472* (2013.01); *G02B 6/4453* (2013.01); *G02B 6/3885* (2013.01); *G02B 6/3897* (2013.01); *G02B 6/4452* (2013.01); *Y10T 29/49826* (2015.01)

(58) Field of Classification Search
CPC .. G02B 6/3885; G02B 6/3897; G02B 6/4452; G02B 6/4472; G02B 6/28; G02B 6/3807; G02B 6/3869; G02B 6/4434; G02B 6/4453; G02B 6/4471; G02B 6/46
USPC .................. 385/24, 76, 78, 100, 134–137
See application file for complete search history.

(56) References Cited

U.S. PATENT DOCUMENTS

| | | | |
|---|---|---|---|
| 6,224,269 B1 | 5/2001 | Engstrand et al. | |
| 6,498,882 B1 | 12/2002 | Buckelew et al. | |
| 6,694,083 B2 | 2/2004 | Paradiso et al. | |
| 6,758,600 B2 | 7/2004 | Del Grosso et al. | |
| 6,869,227 B2 | 3/2005 | Del Grosso et al. | |
| 7,147,383 B2 | 12/2006 | Sullivan | |
| 7,237,966 B2 | 7/2007 | Quinby et al. | |
| 7,416,347 B2 | 8/2008 | Livingston et al. | |
| 7,689,079 B2 * | 3/2010 | Burnham | G02B 6/3897 385/15 |
| 7,756,371 B1 * | 7/2010 | Burnham | G02B 6/4472 385/15 |
| 8,961,035 B2 | 2/2015 | LeBlanc et al. | |
| 2012/0189259 A1 | 7/2012 | Manes | |
| 2014/0029909 A1 * | 1/2014 | Rhoney | G02B 6/4472 385/137 |

* cited by examiner

*Primary Examiner* — Akm Enayet Ullah
*Assistant Examiner* — Michael Mooney
(74) *Attorney, Agent, or Firm* — Amin, Turocy & Watson, LLP (57) ABSTRACT

A pre-terminated fiber optic connector is provided for coupling electronic components and devices. A multi-fiber optical cable assembly or multi-fiber interconnection module can facilitate optical coupling while maximizing available optical path bandwidth inherent to standard connectors. In an embodiment, a "2×24/24 to 2×20/24+1×8/12" configuration can be employed.

20 Claims, 10 Drawing Sheets

```
┌─────────────────────────────────────────────────────────────────────────┐
│ INSTALL A FIRST END OF A PLURALITY OF OPTICAL FIBERS TO A PLURALITY    │
│ OF OPTICAL PATHS RELATED TO A FIRST MULTI-FIBER OPTICAL                │
│ CONNECTOR AND A SECOND MULTI- FIBER OPTICAL CONNECTOR, WHEREIN         │
│ THE PLURALITY OF OPTICAL PATHS ARE ACTIVE                    802       │
└─────────────────────────────────────────────────────────────────────────┘
                                    │
                                    ▼
┌─────────────────────────────────────────────────────────────────────────┐
│ SELECT A SET OF MULTI-FIBER OPTICAL CONNECTORS IN WHICH TO             │
│ INSTALL A SECOND END OF THE PLURALITY OF OPTICAL FIBERS, WHEREIN       │
│ A SUM OF THE OPTICAL PATHS OF THE SET OF MULTI-FIBER OPTICAL           │
│ CONNECTORS IS GREATER THAN THE PLURALITY OF OPTICAL PATHS              │
│ RELATED TO THE FIRST MULTI-FIBER OPTICAL CONNECTOR AND THE             │
│ SECOND MULTI-FIBER OPTICAL CONNECTOR                                   │
│                                                              804       │
└─────────────────────────────────────────────────────────────────────────┘
                                    │
                                    ▼
┌─────────────────────────────────────────────────────────────────────────┐
│ INSTALL THE SET OF MULTI-FIBER OPTICAL CONNECTORS TO A SECOND          │
│ END OF THE PLURALITY OF OPTICAL FIBERS                                 │
│                                                              806       │
└─────────────────────────────────────────────────────────────────────────┘
                                    │
                                    ▼
┌─────────────────────────────────────────────────────────────────────────┐
│ DESIGNATE A FIRST PORTION OF THE PLURALITY OF OPTICAL PATHS AS         │
│ TRANSMIT CHANNELS AND A SECOND EQUAL PORTION AS RECEIVE                │
│ CHANNELS                                                     808       │
└─────────────────────────────────────────────────────────────────────────┘
```

EFFICIENT FIBER USAGE WITHIN PRE-TERMINATED FIBER DEVICES

CROSS-REFERENCE TO RELATED APPLICATIONS

This application claims priority to U.S. Provisional Application Ser. No. 61/793,692, filed on Mar. 15, 2013, and entitled "EFFICIENT FIBER USAGE WITHIN PRE-TERMINATED FIBER DEVICES," the entirety of which is incorporated by reference.

TECHNICAL FIELD

The disclosed subject matter relates to communicatively coupling electronic, fiber optic and optoelectronic components and, more particularly, to coupling multi-path electronic, fiber optic and optoelectronic components by way of multi-fiber optical component(s) and/or technique(s).

BACKGROUND

Conventional fiber optic cables comprise one or more optical fibers to conduct light. Modulation of the light can encode information or signals. Thus, light transmitted across fiber optic cables can communicatively couple electronic, fiber optic and optoelectronic components. The volume of information that can be communicated across fiber optic cables typically far exceeds the volume in a corresponding copper core electrical cable. Examples of data communication over fiber optic cables include the transmission of large quantities of voice information over telephone system fiber optic cables, data transmission over fiber optic internet backbone cables, etc.

Increasingly, fiber optic cables are being employed in more granular applications, such as local area networks employing optical transceivers, corporate intranets deploying optical pathways for high-speed transmission of data on a corporate campus, etc. Standards and guidelines have emerged to help direct the adoption of fiber optic related cabling and components at these more granular levels. As an example of these guidelines, the Telecommunications Industry Association/Electronic Industries Alliance guidelines, ANSI/TIA-568-C.3, outlines three recommended methods (methods A, B and C) for assuring correct transmit-to-receive polarity over serial duplex fiber circuits using ribbon cables and array connectors.

Adoption of particular standards or adherence to guidelines can result in reliance on said standard or guidelines and difficulty in incorporating or adopting elements from other standards or guidelines. As an example, incorporating fiber optic cabling from the aforementioned ANSI/TIA-568-C.3 guidelines includes a suggestion that intermixing cabling components from methods A, B, and/or C may result in incorrect polarity. These types of limitations can impact transitioning a system employing optical components as the system evolves over time.

The deficiencies of conventional fiber optic cabling, systems, and methods described herein are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to optical coupling in optical network environments. In an embodiment, a fiber optic cable assembly can include a multi-fiber optical cable comprising optical fibers, the optical fibers comprising logical channels. A first multi-fiber optical connector can have installed therein a first subset of the optical fibers comprising a first subset of the logical channels from a first end of the multi-fiber optical cable, wherein the first multi-fiber optical connector has no inactive optical paths. A second multi-fiber optical connector can have installed therein a second subset of the optical fibers comprising a second subset of the logical channels from the first end of the multi-fiber optical cable, wherein the second multi-fiber optical connector has no inactive optical paths. A plurality of multi-fiber optical connectors can have installed the optical fibers comprising the logical channels from a second end of the multi-fiber optical cable different than the first end.

In another embodiment, a multi-fiber interconnection module can include a plurality of optical fibers, the plurality of optical fibers comprising a plurality of logical channels. A first multi-fiber optical connector can have installed therein a first subset of the plurality of optical fibers comprising a first subset of the plurality of logical channels from a first end of the plurality of optical fibers wherein the first multi-fiber optical connector has no inactive paths. A second multi-fiber optical connector can have installed therein a second subset of the plurality of optical fibers comprising a second subset of the plurality of logical channels from the first end of the plurality of optical fibers wherein the second multi-fiber optical connector has no inactive paths. A plurality of multi-fiber optical connectors can have installed therein the plurality of optical fibers from a second end of the optical fibers.

In a further embodiment, a method comprises identifying each of a plurality of optical paths related to a first multi-fiber optical connector and a second multi-fiber optical connector. The method further provides for installing a first end of a plurality of optical fibers to the plurality of optical paths wherein the plurality of optical paths are active. The method further provides for selecting a set of multi-fiber optical connectors in which to install a second end of the plurality of optical fibers, wherein the sum of the optical paths of the set of multi-fiber optical connectors is greater than the plurality of optical paths related to the first multi-fiber optical connector and the second multi-fiber optical connector. The method further provides for installing the set of multi-fiber optical connectors to a second end of the plurality of optical fibers.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

The presently disclosed subject matter illustrates optical coupling devices, systems, and methods. More particularly, optical coupling devices, systems and methods employing multiple optical communication pathways are disclosed. Multi-fiber optical cables can be used to pipe light in multi-path optical systems.

Multi-fiber optical cables can be terminated with multi-fiber connectors. Multiple fiber connectors have evolved, and continue to do so, since the inception of fiber optic cabling. One contemporary multi-fiber optical connector is the Multi-fiber Push on/Pull off (MPO) connector. A similar multi-fiber optical connector is the Multi-fiber Terminator Push on/Pull off (MTP) connector. It should be noted that while these terms may be used in the following description, they are not meant to be used in a limiting manner and any other suitable multi-fiber connector could be substituted where MTP/MPO connectors are disclosed, unless explicitly stated otherwise.

MTP/MPO connectors have become widely accepted for their ease of use, reliability, and low losses for multi-fiber optical coupling. MTP/MPO connectors can come in numerous fiber/path configurations and keyed to provide polarity when connecting the MTP/MPO with other components. Popular MTP/MPO configurations include 2-fiber/path and 12-fiber/path configurations. Moreover, configurations that employ multiples of 12-fiber/path configurations appear to be gaining traction and can include a 12-fiber/path connector and a 24-fiber/path connector. A 12-fiber/path MTP/MPO connector can arrange the 12 optical paths in a linear layout such that subsequent optical paths are linearly arranged. Optical fiber would then typically be set in each of the 12 optical paths, bonded in place, and polished to provide a suitable mating surface to facilitate optical coupling with a component designed to receive the MTP/MPO connector. Similarly, a 24-fiber MTP/MPO connector can arrange the 24 optical paths in two rows of twelve optical paths arranged in a generally rectangular pattern. It will be noted that other alternate layout geometries can be employed without departing from the scope of the present disclosure. For ease of discussion and clarity, the present disclosure can be discussed in terms of 12-fiber/path and 24-fiber/path MTP/MPO connectors, though it is explicitly not so limited. It will be noted that other qualities of optical fibers/paths, or other styles of connector, can be employed without departing from the scope of the present disclosure.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Figure 1:
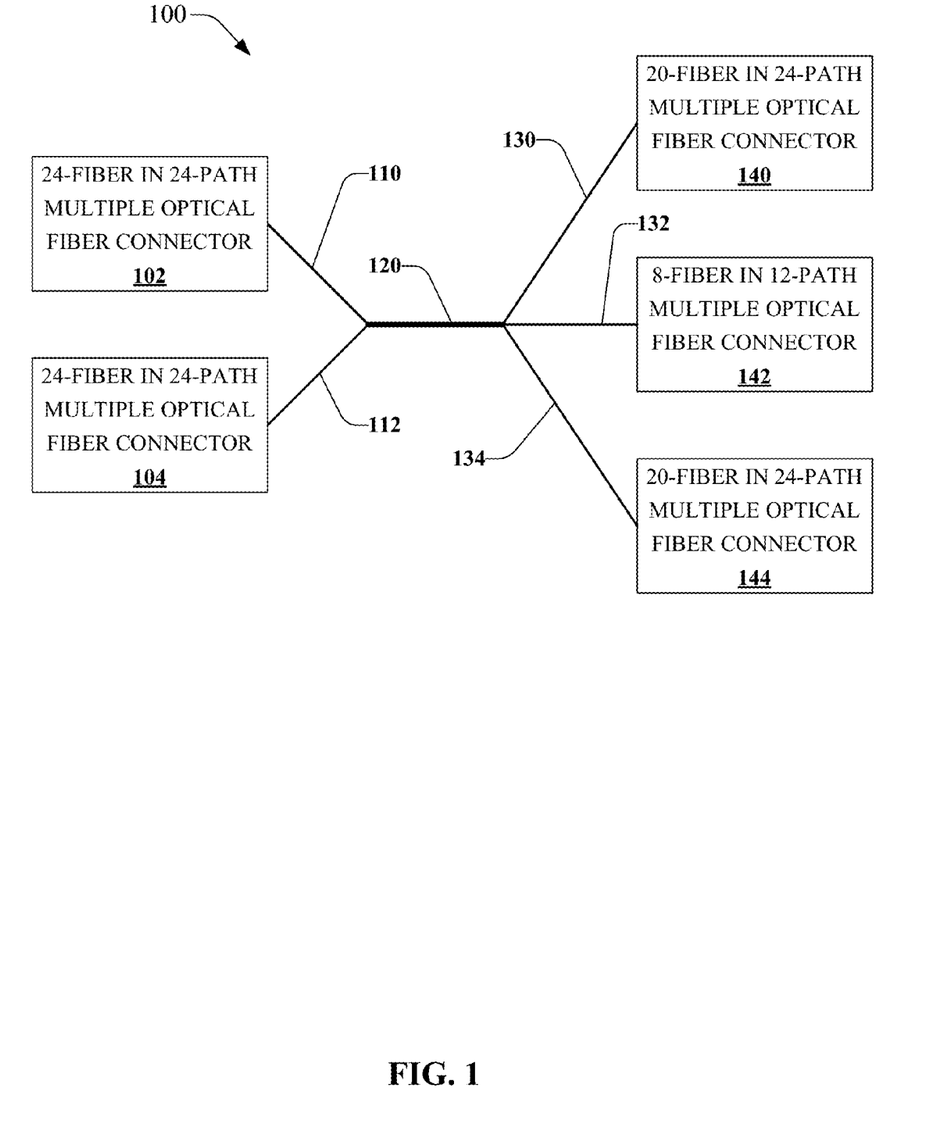
FIG. 1 illustrates a block diagram of a fiber optic cable assembly in accordance with aspects of the subject disclosure.

Referring now to FIG. 1, there is illustrated a block diagram of a fiber optic cable assembly 100 in accordance with aspects of the subject disclosure. Fiber optic cable assembly 100 can include a multi-fiber optical cable 120 comprising at least 48 optical fibers. These fibers can be split at a first end of the cable into two groups of 24 fibers 110 and 112 respectively. At the end of the first group of 24 fibers 110, a 24 fiber in 24 path multiple optical fiber connector 102 can be installed to terminate the first group of fibers 110. At the end of the second group of 24 fibers 112, a second 24 fiber in 24 path multiple optical fiber connector 104 can be installed to terminate the second group of fibers 112. It can be appreciated that there are no inactive paths among 24 fiber in 24 path multiple optical fiber connectors 102 and 104.

The set of fibers within multi-fiber optical cable 120 can be split at a second end of the cable into three groups 130, 132, and 134 respectively. Groups 130 and 134 can contain 20 fibers each while group 132 can contain the remaining 8 fibers. Group 130 can be terminated by a 20 fiber in 24-path multiple optical fiber connector 140. Similarly, group 134 can be terminated by a 20 fiber in 24-path multiple optical fiber connector 144. Group 132 can be terminated by an 8 fiber in 12 path multiple optical fiber connector 142. It can be appreciated that 20 fiber in 24-path multiple optical fiber connectors 140 and 144 as well as 8 fiber in 12 path multiple optical fiber connector 142 have inactive paths as a lesser amount of fibers are received to terminate within the respective connectors than there are available terminated paths.

Installation of optical fibers in multi-fiber optical connectors can be associated with identifying each individual fiber and installing it in a predetermined path of a multi-fiber connector. The particular mapping of an optical fiber associated with a particular identifier, such as color or relative position in a ribbon cable, can be prescribed by accepted industry standards such that users familiar with the given standard applied to a mapping can employ an optical cable assembly or optical cable module of a given standard in the appropriate manner. As an example, a particular color can be associated with a fiber that is always installed in a first position of a connector.

Fiber optic cable assembly 100 includes multi-fiber optical fiber connector 140. Connectors 140 and 144 are 24-path multiple optical fiber connectors as illustrated. Whereas exemplary bunches 130 and 134 respectively comprise 20 optical fibers, these fibers can be installed in connectors 140 and 144 to result in two 20 fiber in 24 path multiple optical fiber connectors. As previously disclosed, the particular fiber installation layout can be predetermined such that particular identified optical fibers are installed in particular path positions within a connector. Whereas a 20 fiber in 24 path connector designates only 20 paths as installed with fiber, four paths can remain uninstalled or empty.

Connector 142, for example, can be a 12-path multiple optical fiber connector as illustrated. Whereas exemplary bunch 132 comprises 8 optical fibers, these fibers can be installed in connector 142 to result in an 8 fiber in 12 path multiple optical fiber connector. As previously disclosed, the particular fiber installation layout can be predetermined such that particular identified optical fibers are installed in particular path positions within a connector such as connector 140. Whereas an 8 fiber in 12 path connector designates only eight paths as installed with fiber, four paths can remain uninstalled or empty.

In a further aspect, empty paths for connectors installed on one end of a multi-fiber optical cable need not be associated with empty paths for connectors installed on the distal end of the multi-fiber optical cable. Of note, cable assembly or module configurations having full connectors on a first end and empty path positions on a second end of an optical cable can be desirable for many reasons. As a non-limiting example, as in Fiber optic cable assembly 100, industry standard 12 and 24 path connectors can be employed eliminating the need to employ non-standard connectors, e.g., 20 path and 8 path connectors.

Figure 5:
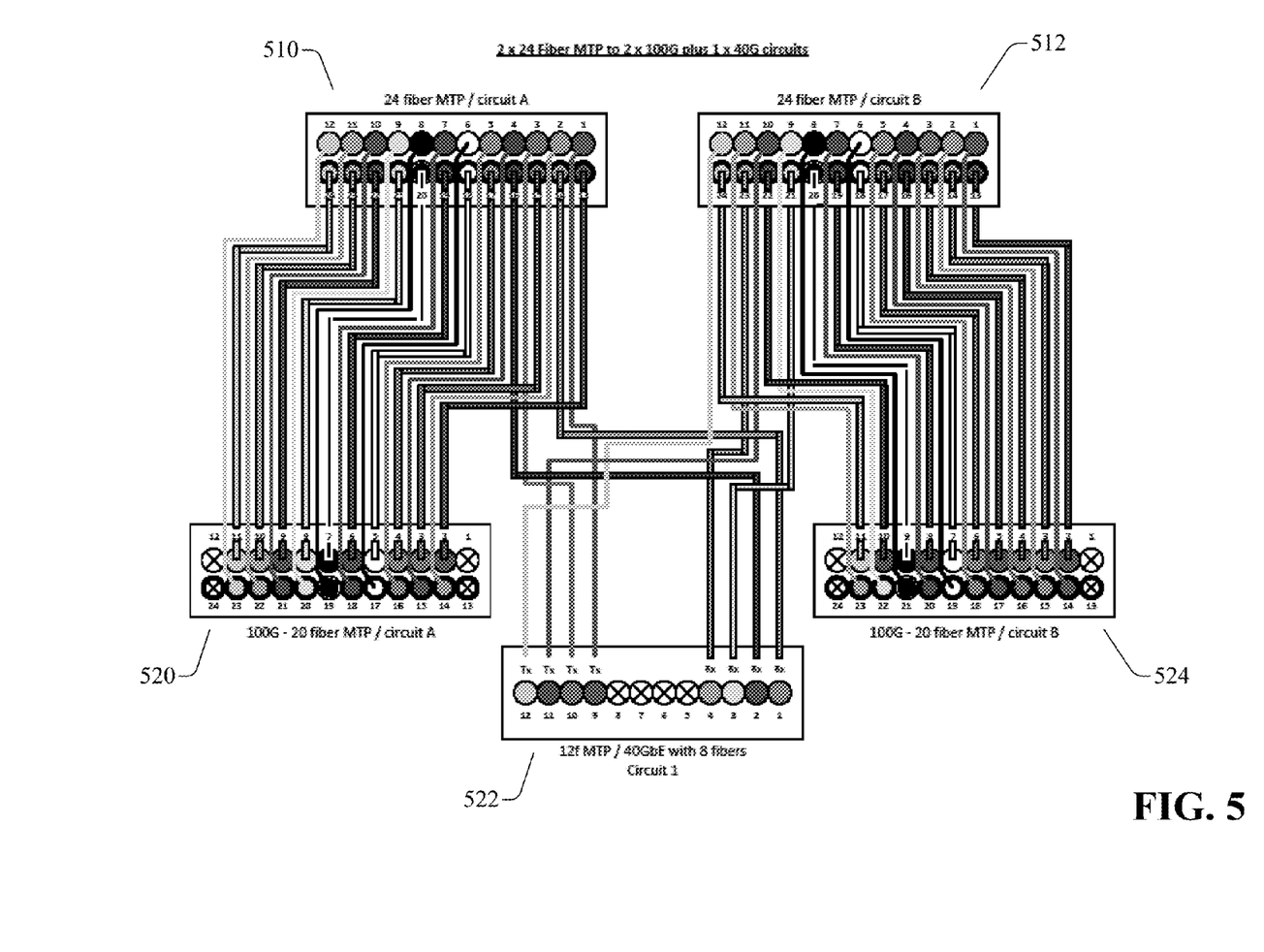
FIG. 5 illustrates an optical fiber layout schematic that facilitates optical coupling in accordance with aspects of the subject disclosure.

Table 1 shows exemplary mapping of 48 fibers from two 24-fiber 24-path (connectors 102 and 104) as depicted in FIG. 5, to three bundles: two bundles of 20 optical fibers and one of 8 optical fibers. The first bundle of 20 optical fibers is installed on 24 path connector 140, the second bundle of 20 optical fibers is installed on 24 path connector 144, and the third bundle of 8 optical fibers is installed on 12 path connector 142.

| Fiber ID and Position Connectors 102 & 104 | Fiber ID and Position Connector 140 | Fiber ID and Position Connector 142 | Fiber ID and Position Connector 144 |
|---|---|---|---|
| 102 - 1  | Empty | 9     | Empty |
| 102 - 2  | 14    | Empty | Empty |
| 102 - 3  | Empty | 10    | Empty |
| 102 - 4  | 15    | Empty | Empty |
| 102 - 5  | 16    | Empty | Empty |
| 102 - 6  | 17    | Empty | Empty |
| 102 - 7  | 18    | Empty | Empty |
| 102 - 8  | 19    | Empty | Empty |
| 102 - 9  | 20    | Empty | Empty |
| 102 - 10 | 21    | Empty | Empty |
| 102 - 11 | 22    | Empty | Empty |
| 102 - 12 | 23    | Empty | Empty |
| 102 - 13 | 2     | Empty | Empty |
| 102 - 14 | Empty | 1     | Empty |
| 102 - 15 | 3     | Empty | Empty |
| 102 - 16 | Empty | 2     | Empty |
| 102 - 17 | 4     | Empty | Empty |
| 102 - 18 | 5     | Empty | Empty |
| 102 - 19 | 6     | Empty | Empty |
| 102 - 20 | 7     | Empty | Empty |
| 102 - 21 | 8     | Empty | Empty |
| 102 - 22 | 9     | Empty | Empty |
| 102 - 23 | 10    | Empty | Empty |
| 102 - 24 | 11    | Empty | Empty |
| 104 - 1  | Empty | Empty | 14    |
| 104 - 2  | Empty | Empty | 15    |
| 104 - 3  | Empty | Empty | 16    |
| 104 - 4  | Empty | Empty | 17    |
| 104 - 5  | Empty | Empty | 18    |
| 104 - 6  | Empty | Empty | 19    |
| 104 - 7  | Empty | Empty | 20    |
| 104 - 8  | Empty | Empty | 21    |
| 104 - 9  | Empty | Empty | 22    |
| 104 - 10 | Empty | 11    | Empty |
| 104 - 11 | Empty | Empty | 23    |
| 104 - 12 | Empty | 12    | Empty |
| 104 - 13 | Empty | Empty | 2     |
| 104 - 14 | Empty | Empty | 3     |
| 104 - 15 | Empty | Empty | 4     |
| 104 - 16 | Empty | Empty | 5     |
| 104 - 17 | Empty | Empty | 6     |
| 104 - 18 | Empty | Empty | 7     |
| 104 - 19 | Empty | Empty | 8     |
| 104 - 20 | Empty | Empty | 9     |
| 104 - 21 | Empty | 3     | Empty |
| 104 - 22 | Empty | Empty | 10    |
| 104 - 23 | Empty | 4     | Empty |
| 104 - 24 | Empty | Empty | 11    |

| Fiber ID and Position Connectors 102 & 104 | Fiber ID and Position Connector 140 | Fiber ID and Position Connector 142 | Fiber ID and Position Connector 144 |
|---|---|---|---|
| 102 - 1  | 14    | Empty | Empty |
| 102 - 2  | Empty | 9     | Empty |
| 102 - 3  | 15    | Empty | Empty |
| 102 - 4  | Empty | 10    | Empty |
| 102 - 5  | 16    | Empty | Empty |
| 102 - 6  | 17    | Empty | Empty |
| 102 - 7  | 18    | Empty | Empty |
| 102 - 8  | 19    | Empty | Empty |
| 102 - 9  | 20    | Empty | Empty |
| 102 - 10 | 21    | Empty | Empty |
| 102 - 11 | 22    | Empty | Empty |
| 102 - 12 | 23    | Empty | Empty |
| 102 - 13 | Empty | 1     | Empty |
| 102 - 14 | 2     | Empty | Empty |
| 102 - 15 | Empty | 2     | Empty |
| 102 - 16 | 3     | Empty | Empty |
| 102 - 17 | 4     | Empty | Empty |
| 102 - 18 | 5     | Empty | Empty |
| 102 - 19 | 6     | Empty | Empty |
| 102 - 20 | 7     | Empty | Empty |
| 102 - 21 | 8     | Empty | Empty |
| 102 - 22 | 9     | Empty | Empty |
| 102 - 23 | 10    | Empty | Empty |
| 102 - 24 | 11    | Empty | Empty |
| 104 - 1  | Empty | Empty | 14    |
| 104 - 2  | Empty | Empty | 15    |
| 104 - 3  | Empty | Empty | 16    |
| 104 - 4  | Empty | Empty | 17    |
| 104 - 5  | Empty | Empty | 18    |
| 104 - 6  | Empty | Empty | 19    |
| 104 - 7  | Empty | Empty | 20    |
| 104 - 8  | Empty | Empty | 21    |
| 104 - 9  | Empty | 11    | Empty |
| 104 - 10 | Empty | Empty | 22    |
| 104 - 11 | Empty | 12    | Empty |
| 104 - 12 | Empty | Empty | 23    |
| 104 - 13 | Empty | Empty | 2     |
| 104 - 14 | Empty | Empty | 3     |
| 104 - 15 | Empty | Empty | 4     |
| 104 - 16 | Empty | Empty | 5     |
| 104 - 17 | Empty | Empty | 6     |
| 104 - 18 | Empty | Empty | 7     |

-continued

| Fiber ID and Position Connectors 102 & 104 | Fiber ID and Position Connector 140 | Fiber ID and Position Connector 142 | Fiber ID and Position Connector 144 |
|---|---|---|---|
| 104 - 19 | Empty | Empty | 8 |
| 104 - 20 | Empty | Empty | 9 |
| 104 - 21 | Empty | Empty | 10 |
| 104 - 22 | Empty | 3 | Empty |
| 104 - 23 | Empty | Empty | 11 |
| 104 - 24 | Empty | 4 | Empty |

Figure 6:
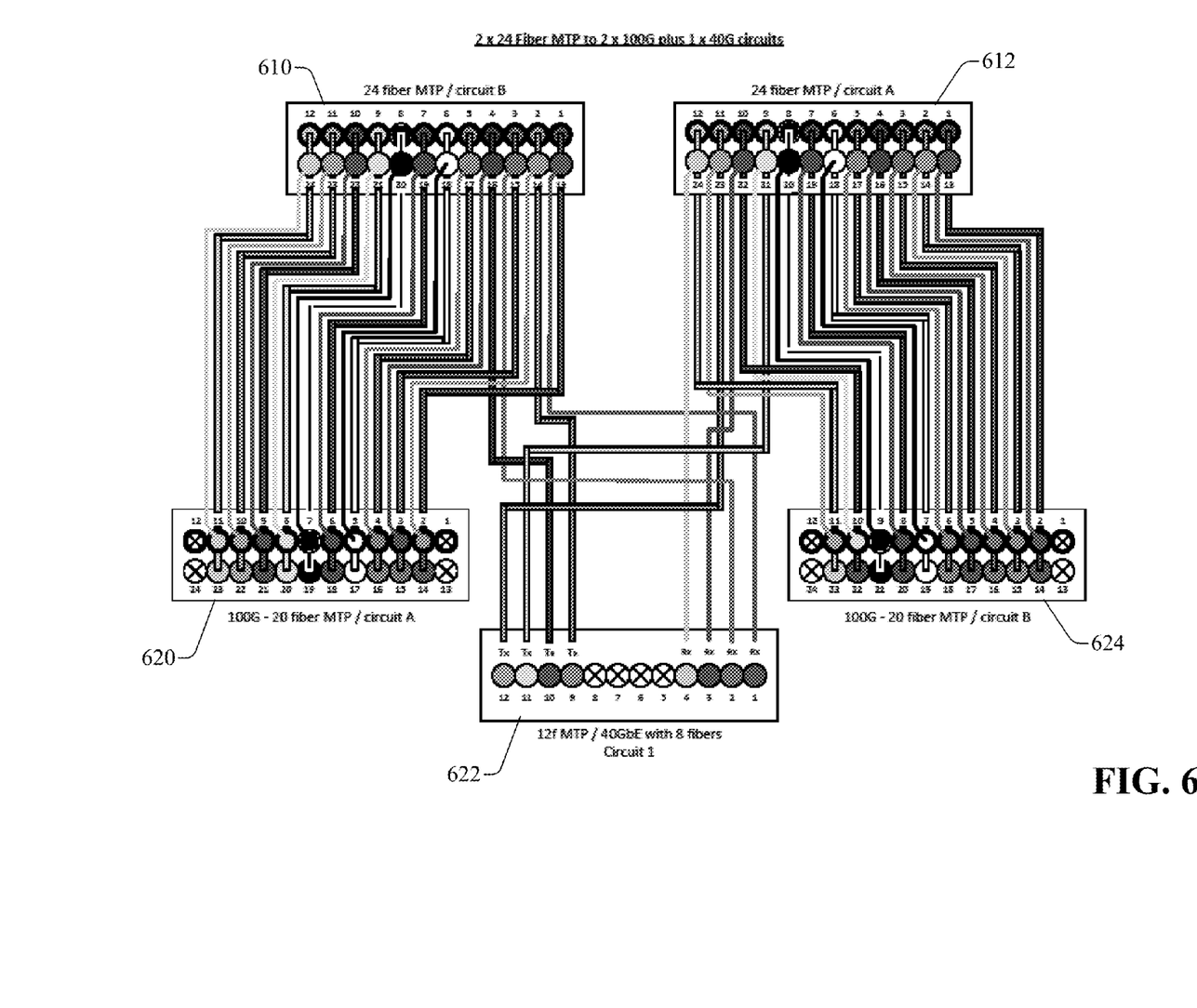
FIG. 6 illustrates an optical fiber layout schematic of reversed polarity that facilitates optical coupling in accordance with aspects of the subject disclosure.

Table 2 shows exemplary mapping of 48 fibers from two 24-fiber 24-path (connectors 102 and 104) as depicted in FIG. 6, to three bundles: two bundles of 20 optical fibers and one of 8 optical fibers. The first bundle of 20 optical fibers is installed on 24 path connector 140, the second bundle of 20 optical fibers is installed on 24 path connector 144, and the third bundle of 8 optical fibers is installed on 12 path connector 142.

Tables 2 and 3 respectively illustrate two exemplary mapping of 48 fibers from two 24-fiber 24-path connectors, connectors 102 and 104, to three bundles: two bundles of 20 optical fibers and one of 8 optical fibers. The two bundles of 20 optical fibers are installed on 24 path connectors 140 and 144, and the third bundle of 8 optical fibers is installed on a 12 path connector 142. It should be noted that in both mappings, there are no inactive paths on both 24-fiber 24-path connectors 102 and 104. In a conventional system, connectors 102 and 104 would receive 20 fibers each, leaving four empty paths in the respective connectors. It can be appreciated that by terminating each available path in the connectors 102 and 104 with fiber, an additional eight fibers of bandwidth can be provided.

In a further aspect, fiber optic cable assembly 100 can be embodied in multi-fiber optical cable assemblies (MOCAs) or multi-fiber interconnection modules (MIMs). A MOCA can include an optical cable, e.g., 120, installed in multi-fiber connectors, e.g., 102, 104, 140, 142, and 144. A MOCA can further include strain relief, protective sheathing, boots, end covers/caps, color-coding or other identifiers of cable assembly type, etc.

A MIM can also include an optical cable, e.g., 120, installed in multi-fiber connectors, e.g., 102, 104, 140, 142, and 144. However, a MIM will typically encase these components in a housing, a block of material, etc. As an example, a MIM can be a MOCA mounted within a walled enclosure providing access to the connectors, to allow optical coupling of the fibers, while also limiting access to the remainder of the components within the walled enclosure. MIMs can be embodied as fiber optic cassettes. Another example of a MIM can include casting the optical cable and installed connectors in a block of material, such as an epoxy, plastic, aerogel, urethane, etc. This type of MIM can provide access to the connectors in a manner similar to a walled enclosure but can do so without "walls." In an aspect, a cast-type MIM can be formed on a fixture and reduce the need for assembly of individual parts that can be associated with installing optical module components in a walled enclosure. The cast-type MIM is simply formed in an appropriate manner around the optical fibers and connectors as compared to having to manually place the optical fibers and connectors mechanically into the walls and support structures of a walled enclosure.

Cast-type MIMs can further include layered cast materials. As an example, an optical fiber assembly can first be cast in a low-weight urethane foam module. This urethane foam core can then be cast in an elastomeric coating material to provide additional protection to the MIM. The resulting two-layer core can then be cast in a hard thermoplastic module to provide mechanical attachment assemblies, such as holes to bolt the module into a rack mount, etc. It will be noted that any number of layers and materials can be employed in cast-type MIMs without departing from the instant disclosure. It can be further appreciated that the layers and materials can be of any appropriate geometry to provide the desired properties of the MIM. For example, a ruggedized MIM can have a thicker elastomeric layer than a non-ruggedized MIM while still having similar external dimensions. Continuing the preceding example, this can be achieved by employing a smaller urethane casting or a thinner thermoplastic casting for the ruggedized MIM to leave more space for a correspondingly thicker elastomeric layer than would be employed in the non-ruggedized MIM.

Figure 2:
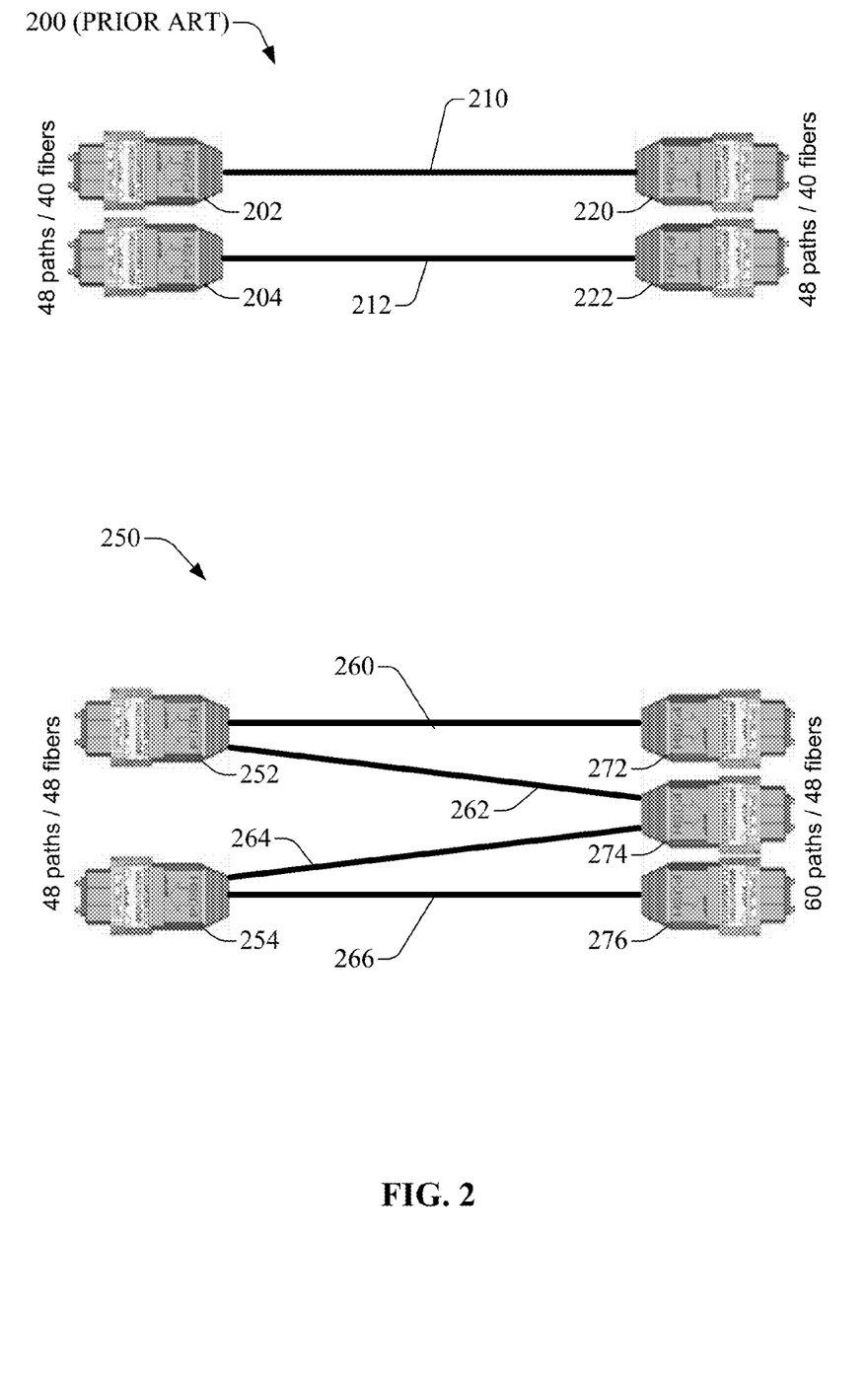
FIG. 2 is a depiction of a fiber optic cable assembly in accordance with aspects of the subject disclosure.

Referring now to FIG. 2, there is depicted a fiber optic cable assembly in accordance with aspects of the subject disclosure. Fiber optic cable assembly 250 can be a MOCA. Fiber optic cable assembly 200 typifies conventional fiber optic cable assemblies for optical coupling. Assembly 200 includes two cable assemblies having 40 fibers terminated within 48 positions. Connectors 202, 204, 220, and 222 are 20-fiber in 24-path connectors. Fiber optic cables 210 and 212 provide connections for 20 fibers between each end of the cable; however, it is also common for conventional fiber optic cable assemblies to install fibers that are not actually employed in optical coupling, e.g., they just take up space in the cable assembly. Thus, conventional fiber optic assemblies generally leave some paths inactive. For example, connectors 202 and 204 have the paths to support 8 more fibers, 4 fibers in each connector.

In contrast, fiber optic cable assembly 250 illustrates two 24-path connectors 252 and 254 with no inactive paths, e.g., 48 fibers for 48 paths. Connectors 272 and 276 can remain as 20-fiber in 24-path connectors as compared to the conventional system; however, an additional 8 fibers of traffic can be terminated into a third connector 274. Thus, the eight inactive paths as described with respect to fiber optic cable assembly 200 are now active: four paths from connector 252 routed to connector 274 via fiber optic cable 262 and four paths from connector 254 routed to connector 274 via fiber optic cable 264. It can be appreciated that connector 274 can be an 8-fiber in 12-path multiple optical fiber connector. Thus, bandwidth over two 24-path connectors can be improved by nearly twenty percent by utilizing the 8 unused paths collectively sitting idle in a conventional connector.

Of note, fiber optic cables can come in a myriad of constructions. Any fiber optic construction germane to installation with multi-fiber optical fiber connectors can be employed without departing from the scope of the subject disclosure. This can include both ribbon-type and round- or loose tube-type fiber optic cables including a plurality of optical fibers therein. Generally, ribbon cable can comprise individual optical fibers arranged in a planar array across an x-axis and extending in the z-axis. The optical fibers take on the appearance of a ribbon, hence the name ribbon cable. In an aspect, ribbon cable can offer excellent flexibility in a YZ-plane. In contrast, ribbon cable can demonstrate substantially less flexibility in the XZ-plane. This lack of flexibility in the XZ-plane can lead to insertion losses at optical connectors resulting from stresses on the ribbon cable. A loose tube round multi-fiber optical cable (round cable) can include one or more loose tubes, arrayed in a XY-plane and extending in a Z-axis direction, which in turn protect a plurality of individual optical fibers. Round cable geometry and design considerations can allow for an optical cable that is similarly flexible in both the YZ- and XZ-planes. In an aspect, the individual optical fibers are allowed to slide within each loose tube during a bending moment. This flexibility allows for a reduction in the stresses incurred to accommodate a bend as compared to being rigidly bound to the other structures of the round cable. Round cable is generally considered to be more flexible than ribbon cable. In an aspect, the optical fibers disclosed herein, e.g., 120, 210, 212, 260, 262, 264, 266, etc. can be of any type, including either ribbon-type or round-type cable. Furthermore, whereas round cable is generally considered to be more flexible, the use of round cable as an optical fiber may be preferential in many situations to reduce insertion losses.

Of further note, fiber optic connector end faces can be polished in nearly any manner to facilitate optical interconnection with other components. Polish types can include flat, physical contact (PC), angled, etc. Flat polish is associated with polishing fibers flat orthogonal to the long axis of the optical fiber. Physical contact polish (PC polish) slightly radiuses the edges of a flat polish. Angle polish can be associated with polishing a flat angle across optical fibers, typically around 8 degrees. The optical cable assemblies and modules disclosed herein can employ any type of polish, including flat, PC, or angle polish types for the mating surfaces of the multi-fiber optical fiber connectors.

Figure 3:
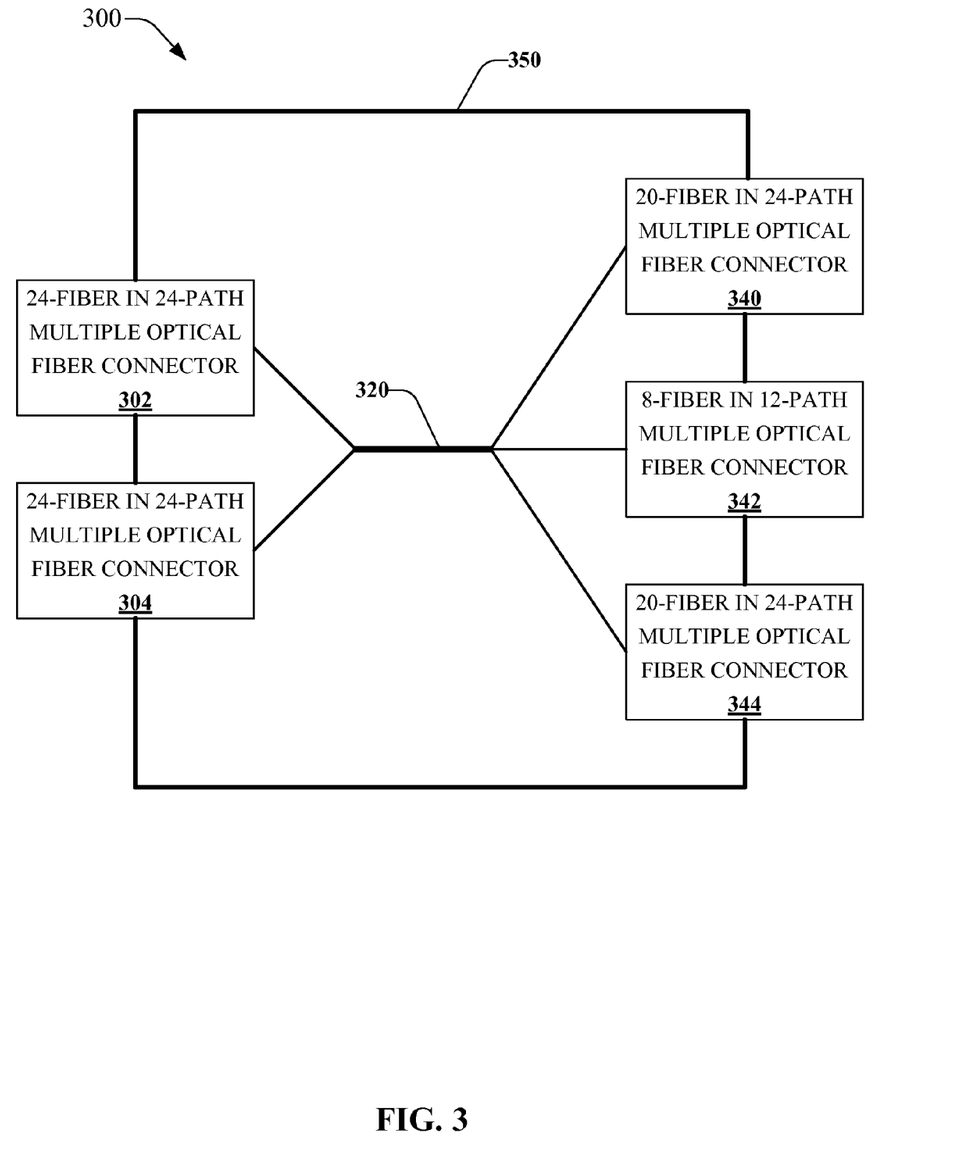
FIG. 3 illustrates a multi-fiber interconnection module in accordance with aspects of the subject disclosure.

Referring now to FIG. 3, there is illustrated a multi-fiber interconnection module 300 in accordance with aspects of the subject disclosure. Multi-fiber interconnection module 300 can offer similar functionality to fiber optic cable assembly in a different package 350. System 300 can illustrate a "2×24/24 to 2×20/24+1×8/12" MIM, e.g., the MIM includes two 24 fiber in 24 path optical connectors 302 and 304 connected by a 48-fiber multi-fiber optical cable 320 to two 20 fiber in 24 path optical connectors 340 and 344 and an 8 fiber in 12 path optical connector 342. Installation of individual optical fibers in each of the multi-fiber optical connectors can be associated with identifying each individual fiber and installing it in a predetermined path of the corresponding multi-fiber connector. The particular mapping of an optical fiber can be prescribed by accepted industry standards, such that users familiar with the given standard can employ an optical cable assembly or optical cable module of a given standard in the appropriate manner without significant characterization of each MIM.

Figure 4:
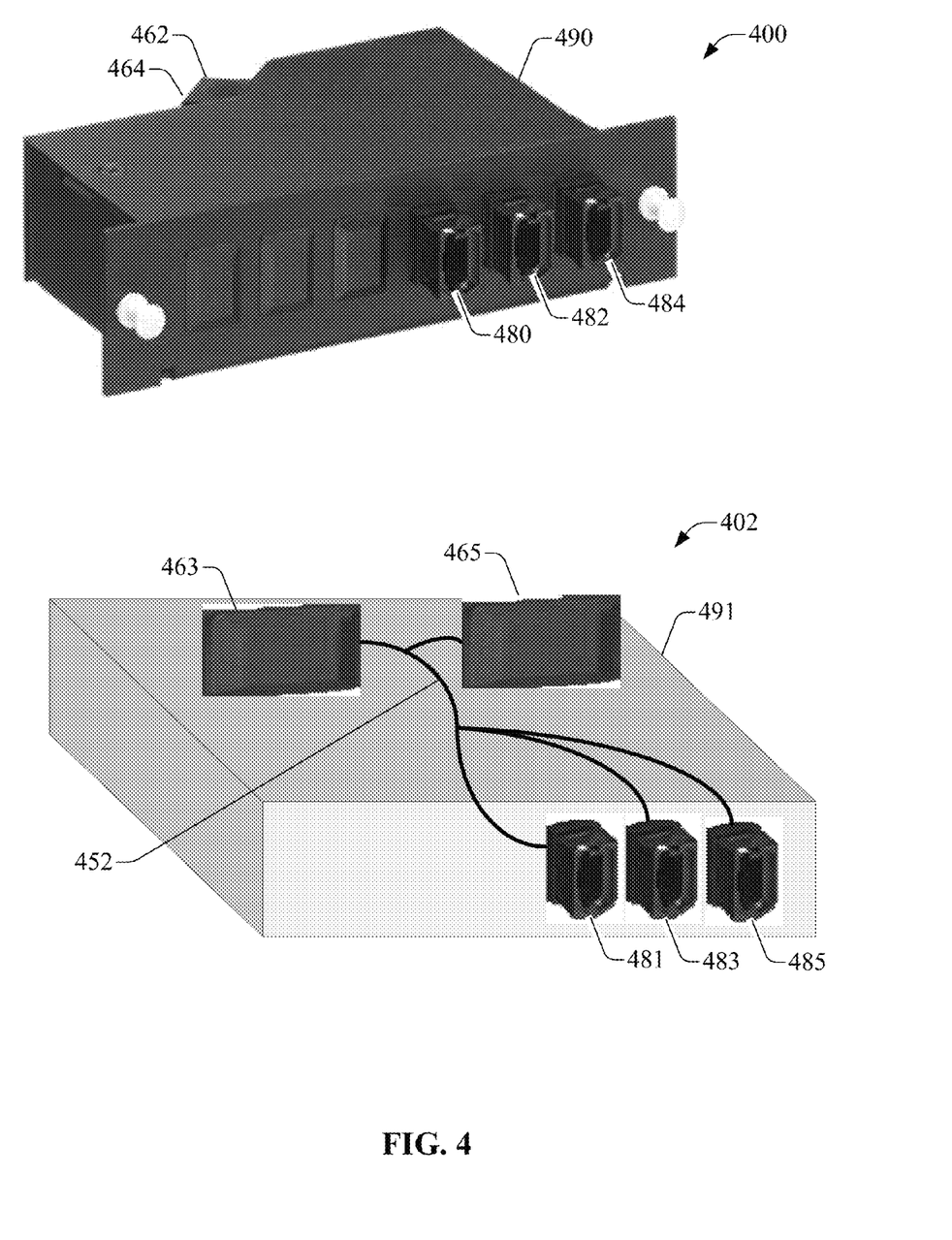
FIG. 4 is a depiction of interconnection modules that facilitate optical coupling in accordance with aspects of the subject disclosure.

Referring now to FIG. 4, there are depicted interconnection modules 400 and 402 that facilitate optical coupling in accordance with aspects of the subject disclosure. Interconnection module 400 can be an illustration of a MIM that transitions between two multi-fiber optical connectors 462 and 464 and three multi-fiber optical connectors 480, 482, and 484. An exemplary interconnection module 400 can illustrate a "2×24/24 to 2×20/24+1×8/12" MIM, e.g., the MIM includes two 24 fiber in 24 path optical connectors 462 and 464, connected by a 48-fiber multi-fiber optical cable, hidden inside enclosure 490, to two 20 fiber in 24 path optical connectors 480 and 484 and an 8 fiber in 12 path optical connector 482. Interconnection module 400 can include an enclosure 490. Enclosure 490 can be a walled enclosure. As an example, a MIM can be a MOCA mounted within a walled enclosure providing access to the connectors, to allow optical coupling of the fibers, while also limiting access to the remainder of the components within the walled enclosure.

Interconnection module 402 can be another example of a MIM and can illustrate a cast-type MIM. A cast-type MIM can include casting an optical cable 452 and installed connectors 463, 465, 481, 483, and 485, in a block of material 491, such as an epoxy, plastic, aerogel, urethane, etc. This type of MIM can provide access to the connectors in a manner similar to a walled enclosure but can do so without "walls."

In an aspect, a cast-type module can be formed on a reusable fixture and can reduce the need for assembly of individual parts that can be associated with installing optical module components in a walled enclosure. The cast-type MIM can be formed in an appropriate manner around the optical fibers and connectors as compared to having to place the optical fibers and connectors mechanically into the walls and support structures of a walled-type enclosure. Cast-type modules can further include layered cast materials. It will be noted that any number of layers and materials can be employed in cast-type modules without departing from the instant disclosure. It will further be appreciated that the layers and materials can be of any appropriate geometry to provide the desired properties of the module.

In a further aspect, a cast-type MIM can encase other components. These other components can include mechanical components, such as reinforcing members, locks, latches, etc. These types of mechanical components can facilitate deployment of the MIM, for example, by casting a latch into the MIM, the MIM can be latched into a rack mount housing without the use of tools such as hex drivers or screwdrivers. Other components can also include sensors such as temperature probes, photosensors, etc. Further still, other components can include identifiers such as radio frequency identifiers (RFIDs) to allow identification of modules or tracking. Another example can include casting a bar code or Quick Response ("QR") code into a portion of the casting that can be read optically, such as a clear portion of casting material or a casting that keeps the bar code or QR code at the surface of the MIM. Still further, a cast-type MIM can include cast voids either partially or wholly within the cast material. As an example, a void can be cast to form a carry handle through a MIM, to create a void so that the MIM weighs less, to create a void to facilitate greater cushioning effects from the casting materials, etc.

Interconnection modules 400 and 402 can be of a standardized size and geometry accommodating deployment and maintenance of optical communications systems by providing drop in replaceable parts. In an aspect, interconnection modules 400 and 402 can be interchangeable, e.g., a cast-type MIM can be equivalent to a walled MIM in function and geometry allowing the two types to be used interchangeably in deployed optical systems. In another aspect, a cast-type MIM can be smaller than a corresponding walled enclosure specifically because there are no wall structures in a cast-type MIM. The inherent support of casting the optical components directly in a material can provide support without the need for walls. As such, a cast-type MIM can be made smaller than a walled enclosure by at least the thickness of a corresponding walled enclosure's walls, illustrating internal support in contrast to external support.

Referring now to FIG. 5, there is illustrated an optical fiber layout schematic that facilitates optical coupling in accordance with aspects of the subject disclosure. The schematic in FIG. 5 presents optical fiber routing between a plurality of multi-fiber connectors. FIG. 5 can represent an optical fiber layout for an optical cable assembly or module. Optical signals can be generated by electronic, fiber optic and optoelectronic components coupled to "Tx" ports. Optical signals can be received by electronic, fiber optic and optoelectronic components coupled to "Rx" ports. Multi-fiber connectors 510 and 512 can be fully populated, e.g., two 24-fiber in 24-path multi-fiber connectors. Multi-fiber connectors 520, 522, and 524 can be partially populated, e.g., 20-fiber in 24-path multi-fiber connectors or 8-fiber in 12-path multi-fiber connectors. Optical routing layout coupling can be as summarized in Table 1 above.

Referring now to FIG. 6, there is illustrated another aspect of an optical fiber layout schematic that facilitates optical coupling in reversed polarity in accordance with aspects of the subject disclosure. It can be appreciated that the polarity of the transmit "Tx" ports and receive "Rx" ports are reversed as compared to the layout depicted in FIG. 5. It can be further appreciated that by reversing polarity, multi fiber connectors 610 and 612 can interface directly with multi-fiber connectors 510 and 512 respectively while maintaining proper signal propagation polarity. For example, a signal propagated through "Tx" port 12 on multi-fiber connector 522 in FIG. 5 is received by "Rx" port 4 on multi-fiber connector 622 in FIG. 6 when connectors 610 and 612 are interfaced directly with connectors 510 and 512. It can be appreciated that the respective ports on FIGS. 5 and 6 are color coded such that color coded optical fibers have a "Tx" port and an "Rx" port.

The schematic in FIG. 6 presents optical fiber routing between a plurality of multi-fiber connectors. FIG. 6 can represent an optical fiber layout for an optical cable assembly or module. Optical signals can be generated by electronic, fiber optic and optoelectronic components coupled to "Tx" ports. Optical signals can be received by electronic, fiber optic and optoelectronic components coupled to "Rx" ports. Multi-fiber connectors 610 and 612 can be fully populated, e.g., two 24-fiber in 24-path multi-fiber connectors. Multi-fiber connectors 620, 622, and 624 can be partially populated, e.g., 20-fiber in 24-path multi-fiber connectors or 8-fiber in 12-path multi-fiber connectors. Optical routing layout coupling can be as summarized in Table 2 above.

Figure 7:
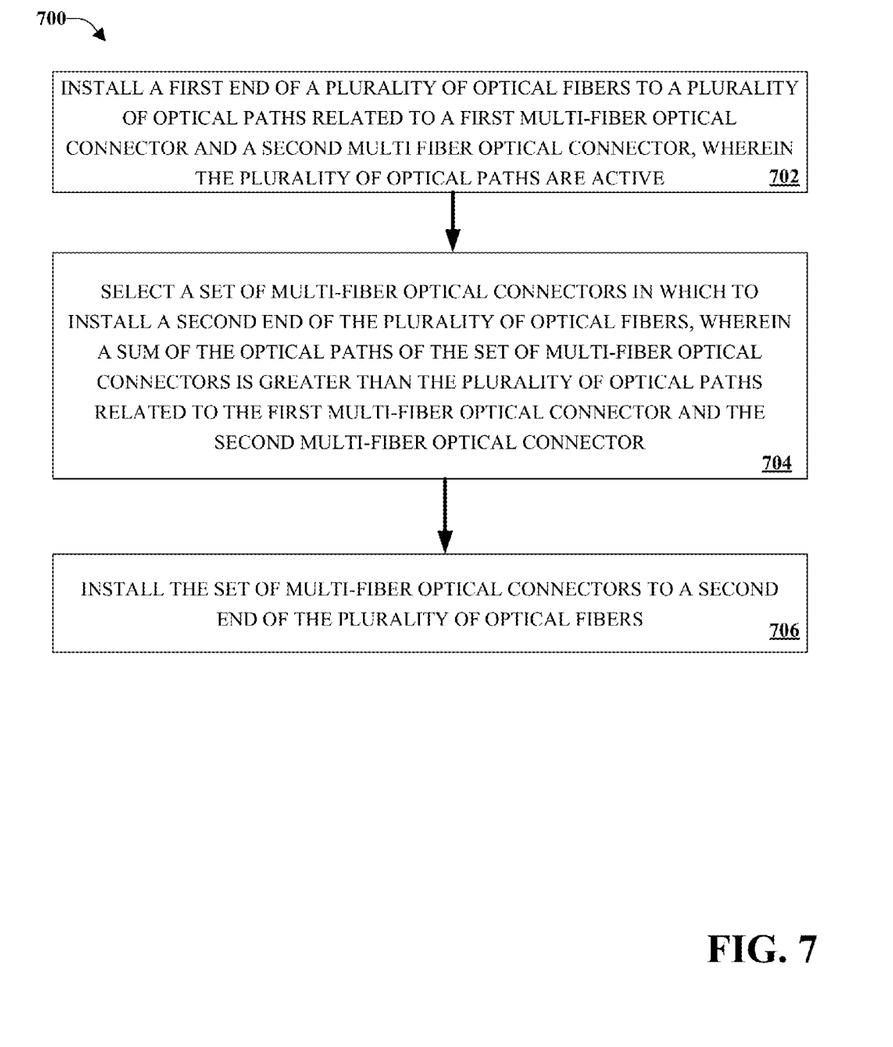
FIG. 7 illustrates a method for identifying and installing a fiber optic component in accordance with aspects of the subject disclosure.
Figure 8:
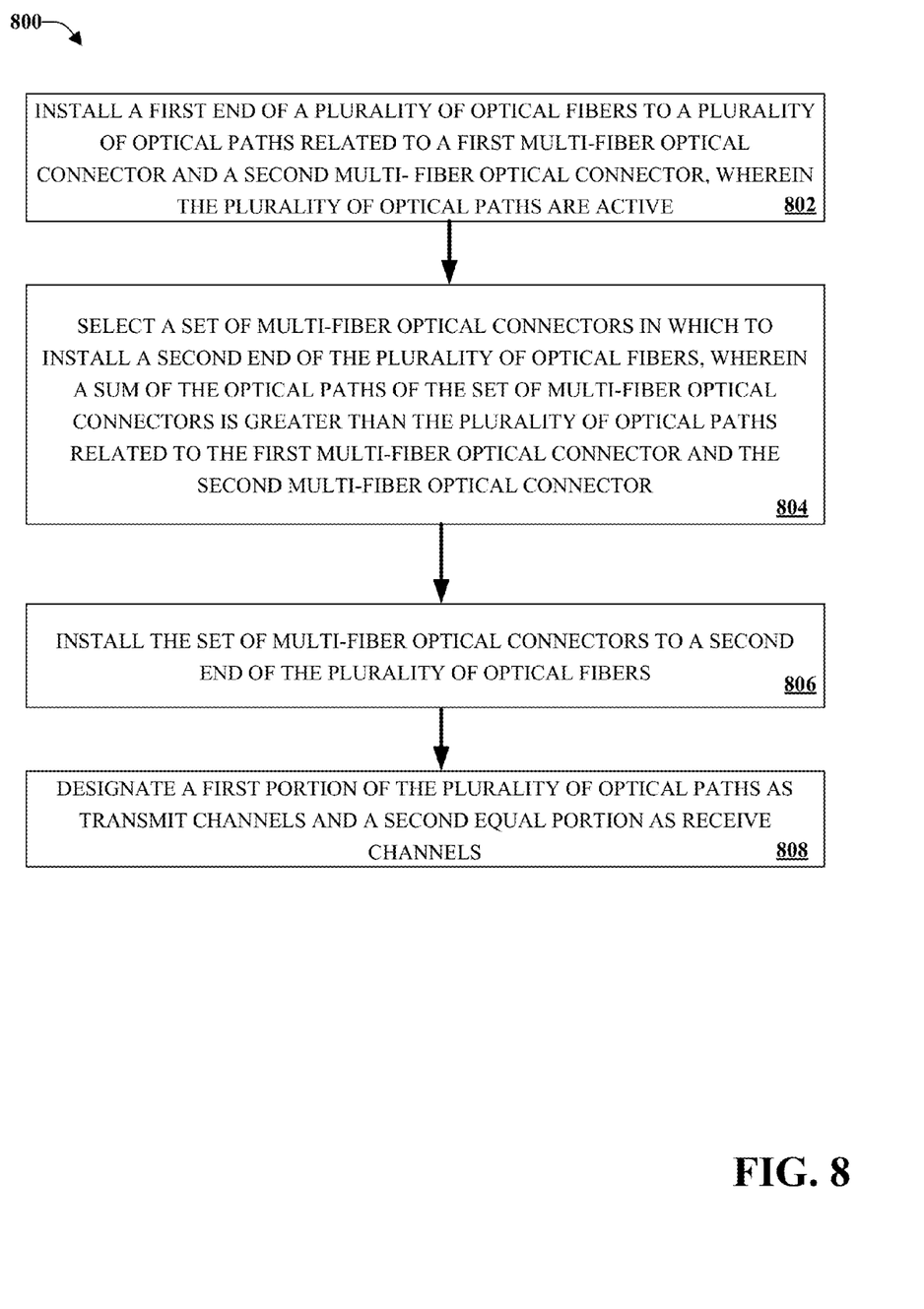
FIG. 8 illustrates a method for identifying and installing a fiber optic component including designating a first set of paths as transmit channels and receive channels in accordance with aspects of the subject disclosure.
Figure 9:
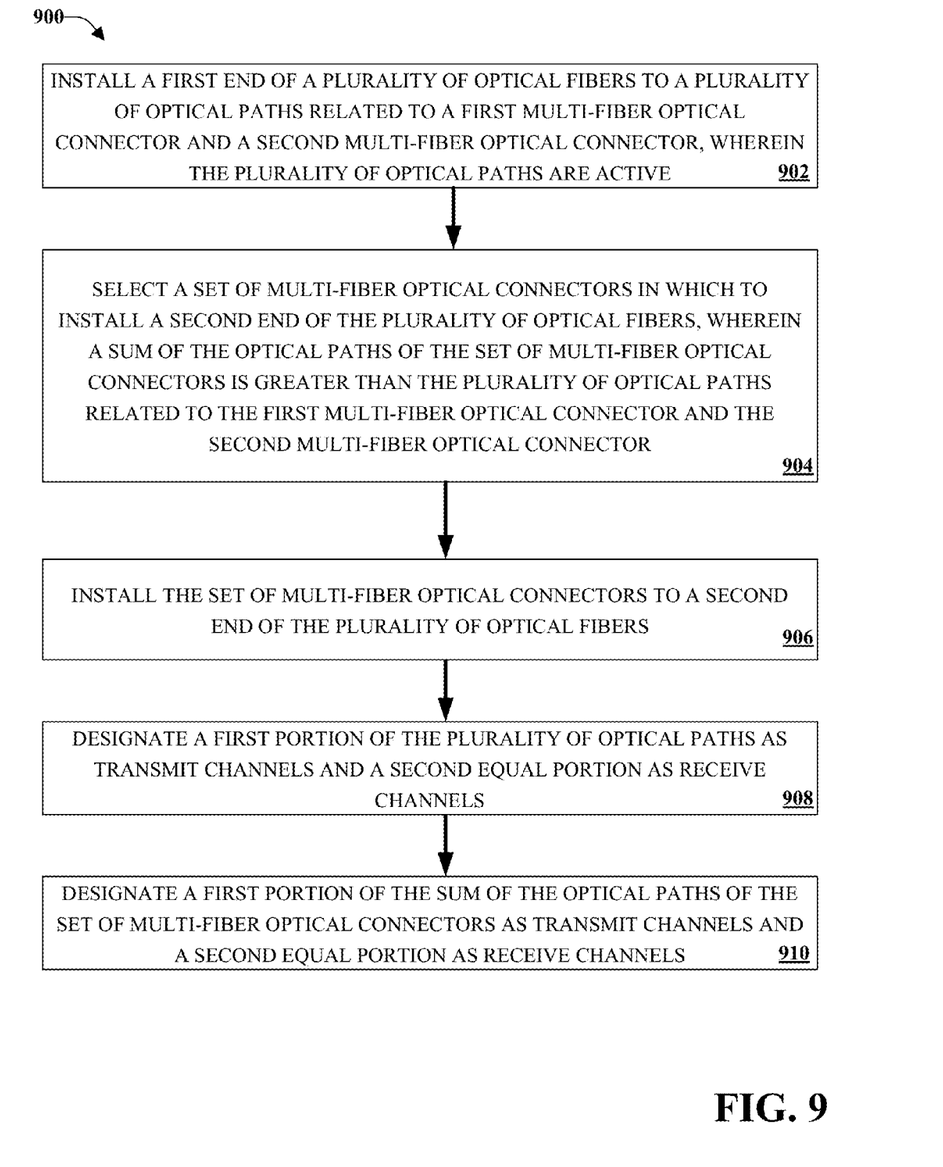
FIG. 9 illustrates a method for identifying and installing a fiber optic component including designating a second set of paths as transmit channels and receive channels in accordance with aspects of the subject disclosure.

FIGS. 7-9 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective fiber optic cable assembly and multi-fiber interconnection module diagrams. It is to be appreciated that the detailed description of such acts in the prior figures can be and are intended to be implementable in accordance with the following methods.

Referring now to FIG. 7, there is illustrated a method for identifying and installing a fiber optic component in accordance with aspects of the subject disclosure. At 702, a first end of a plurality of optical fibers can be installed to a plurality of optical paths related to a first multi-fiber optical connector and a second multi-fiber optical connector, wherein the plurality of optical paths are active. At 704, a set of multi-fiber optical connectors in which to install a second end of the plurality of optical fibers can be selected, wherein a sum of the optical paths of the set of multi-fiber optical connectors is greater than the plurality of optical paths related to the first multi-fiber optical connector and the second multi-fiber optical connector. It can be appreciated that this results in a condition in which there are empty positions when the fibers are installed in the second quantity of connectors and no empty position in the first quantity of connectors. In one implementation, installing the set of multi-fiber optical connectors to the second end of the optical fibers results in respective multi-fiber optical connectors of the set of multi-fiber optical connectors having at least one empty optical path. At 706, the set of multi-fiber optical connectors can be installed to a second end of the plurality of optical fibers.

Referring now to FIG. 8, there is illustrated a method for identifying and installing a fiber optic component including designating a first set of path. At 802, a first end of a plurality of optical fibers can be installed to a plurality of optical paths related to a first multi-fiber optical connector and a second multi-fiber optical connector, wherein the plurality of optical paths are active. At 804, a set of multi-fiber optical connectors in which to install a second end of the plurality of optical fibers can be selected, wherein a sum of the optical paths of the set of multi-fiber optical connectors is greater than the plurality of optical paths related to the first multi-fiber optical connector and the second multi-fiber optical connector. At 806, the set of multi-fiber optical connectors can be installed to a second end of the plurality of optical fibers. At 808, a first portion of the plurality of optical paths can be designated as transmit channels and a second equal portion as receive channels.

Figure 10:
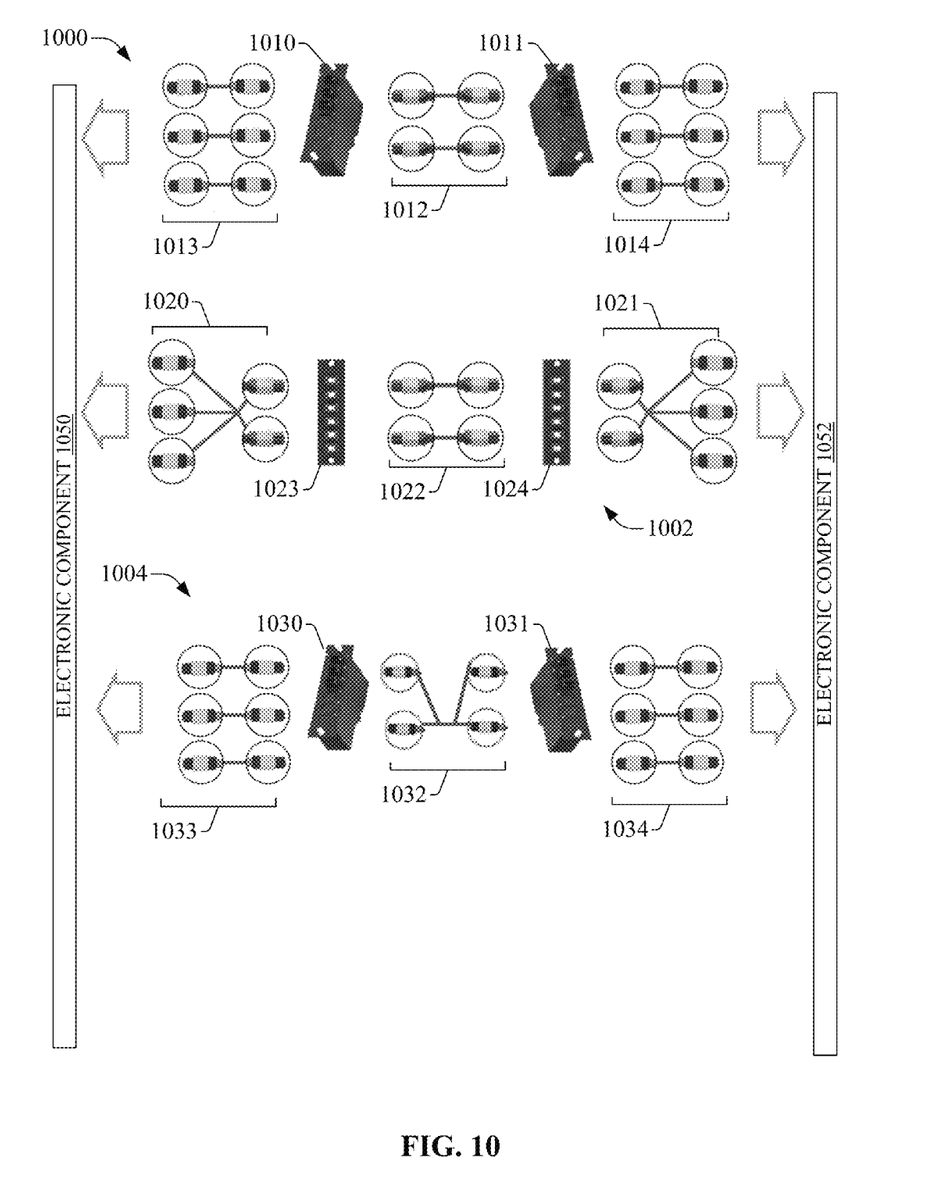
FIG. 10 illustrates exemplary embodiments of optical systems that can implement and exploit one or more aspects of the subject matter described herein.

FIG. 9 illustrates a method for identifying and installing a fiber optic component including designating a second set of paths as transmit channels and receive channels in accordance with aspects of the subject disclosure. At 902, a first end of a plurality of optical fibers can be installed to a plurality of optical paths related to a first multi-fiber optical connector and a second multi-fiber optical connector, wherein the plurality of optical paths are active. At 904, a set of multi-fiber optical connectors in which to install a second end of the plurality of optical fibers can be selected, wherein a sum of the optical paths of the set of multi-fiber optical connectors is greater than the plurality of optical paths related to the first multi-fiber optical connector and the second multi-fiber optical connector. At 906, the set of multi-fiber optical connectors can be installed to a second end of the plurality of optical fibers. At 908, a first portion of the plurality of optical paths can be designated as transmit channels and a second equal portion as receive channels. At 910, a first portion of the sum of the optical paths of the set of multi-fiber optical connecters can be designated as transmit channels and a second equal portion as receive channels FIG. 10 illustrates exemplary embodiments 1000, 1002, and 1004 of optical systems that can implement and exploit one or more aspects of the subject matter described herein. Exemplary optical system 1000 can include MIMs 1010 and 1011, which can be interconnected by optical cable assemblies 1012. MIM 1010 can be optically connected to various components 1050, such as optical, optoelectronic, or electronic components, by way of optical cable assemblies 1013. Similarly, MIM 1011 can be optically connected to various components 1052, such as optical, optoelectronic, or electronic components, by way of optical cable assemblies 1014. As such, optical, optoelectronic, or electronic components 1050 and 1052 can be optically coupled by exemplary optical system 1000. Cable assemblies 1012, for example, can comprise 48 optical fibers in two 24-path cable assemblies. Cable assemblies 1013 and 1014, for example, can each comprise two 24-path cable assemblies and a 12 path cable assembly. MIMs 1010 and 1011, in this example, can be "2×24/24 to 2×20/24+1×8/12" MIMs.

Similarly, in exemplary optical system 1002, optical cable assembly 1022 can comprise 48 optical fibers in two 24-path cable assemblies which can be coupled to MOCAs 1020 and 1021 by way of coupling plates 1023 and 1024, respectively. Coupling plates 1023 and 1024 can couple two 24-path connectors. In an aspect, an optical system can employ MOCA 1020 and coupling plate 1023 in place of MIM 1010 and cable assemblies 1013 from optical system 1000 to achieve the same connectivity. Similarly, MOCA 1021 and coupling plate 1024 can substitute for MIM 1011 and cable assemblies 1014. MOCAs 1020 and 1021, in this example, can be "2×24/24 to 2×20/24+1×8/12" MOCAs.

In exemplary optical system 1004, cable assembly 1032 can comprise 48 optical fibers in two 24-path cable assemblies that can be coupled to MIMs 1030 and 1031 respectively. Cable assemblies 1033 and 1034 can each comprise two 24-path cable assemblies and a 12 path cable assembly. MIMs 1030 and 1031 can therefore each be 2×24/24 to 2×20/24+1×8/12 MIMs.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A fiber optic cable assembly, comprising:
   a multi-fiber optical cable comprising optical fibers, the optical fibers comprising logical channels;
   a first multi-fiber optical connector having installed therein a first subset of the optical fibers from a first end of the multi-fiber optical cable, wherein the first multi-fiber optical connector has no inactive optical paths;
   a second multi-fiber optical connector having installed therein a second subset of the optical fibers from the first end of the multi-fiber optical cable, wherein the second multi-fiber optical connector has no inactive optical paths; and
   a plurality of multi-fiber optical connectors having installed therein the optical fibers from a second end of the multi-fiber optical cable different than the first end, wherein the plurality of multi-fiber optical connectors comprises two twenty-four fiber optical connectors respectively comprising twenty active optical paths and a twelve fiber optical connector comprising eight active optical paths.

2. The fiber optic cable assembly of claim 1, wherein the logical channels comprise forty-eight logical channels.

3. The fiber optic cable assembly of claim 2, wherein the first subset of the optical fibers comprises twenty-four logical channels and second subset of the optical fibers comprises twenty-four logical channels.

4. The fiber optic cable assembly of claim 3, wherein the first multi-fiber optical connector comprises twenty-four first optical paths arranged in two rows of twelve first optical paths, respective first optical paths of the twenty-four first optical paths having disposed therein a respective optical fiber of the first subset of optical fibers, and wherein the second multi-fiber optical connector comprises twenty-four second optical paths arranged in two rows of twelve second optical paths, respective second optical paths of the twenty-four second optical paths having disposed therein a respective optical fiber of the second subset of optical fibers.

5. The fiber optic cable assembly of claim 1, wherein multi-fiber optical connectors of the plurality of multi-fiber optical connectors comprise at least one optical path that does not have an optical fiber of the optical fibers installed therein.

6. The fiber optic cable assembly of claim 1, wherein the two twenty-four fiber optical connectors respectively comprise twenty-four optical paths arranged in two rows of twelve optical paths having positions 1 to 24, and the optical fibers comprising the logical channels are terminated in a subset of the twenty-four optical paths having positions 2 to 11 and 14 to 23, respectively, of the positions 1 to 24, and wherein another subset of the twenty-four optical paths having positions 1, 12, 13 and 24 of the positions 1 to 24 are inactive.

7. The fiber optic assembly of claim 1, wherein the twelve fiber optical connector comprises twelve optical paths arranged in one row of twelve optical paths having positions 1 to 12, and the optical fibers comprising the logical channels are in a subset of the twelve optical paths having positions 1 to 4 and 9 to 12 of the positions 1 to 12, respectively, and wherein another subset of the twelve optical paths having positions 5 to 8 of the positions 1 to 12 are inactive.

8. A multi-fiber interconnection module, comprising:
   a plurality of optical fibers, the plurality of optical fibers comprising a plurality of logical channels;
   a first multi-fiber optical connector having installed therein a first subset of the plurality of optical fibers from a first end of the plurality of optical fibers, wherein the first multi-fiber optical connector has no inactive paths;

a second multi-fiber optical connector having installed therein a second subset of the plurality of optical fibers from the first end of the plurality of optical fibers, wherein the second multi-fiber optical connector has no inactive paths; and a plurality of multi-fiber optical connectors having installed therein the plurality of optical fibers from a second end of the optical fibers, wherein the plurality of multi-fiber optical connectors comprises two twenty-four fiber optical connectors respectively comprising twenty active optical paths and a twelve fiber optical connector comprising eight active optical paths.

9. The multi-fiber interconnection module of claim 8, wherein the plurality of logical channels comprises forty-eight logical channels.

10. The multi-fiber interconnection module of claim 9, wherein the first multi-fiber optical connector has installed therein optical fibers comprising twenty-four logical channels, and wherein the second multi-fiber optical connector has installed therein optical fibers comprising twenty-four logical channels.

11. The multi-fiber interconnection module of claim 10, wherein the first multi-fiber optical connector comprises twenty-four first optical paths arranged in two rows of twelve first optical paths respectively having terminated therein a respective optical fiber of the first subset of optical fibers, and wherein the second multi-fiber optical connector comprises twenty-four second optical paths arranged in two rows of twelve second optical paths respectively having terminated therein an optical fiber of the second subset of optical fibers.

12. The multi-fiber interconnection module of claim 8, wherein multi-fiber optical connectors of the plurality of multi-fiber optical connectors comprise at least one optical path that does not have an optical fiber of the plurality of optical fibers terminated therein.

13. The multi-fiber interconnection module of claim 8, wherein the two twenty-four fiber optical connectors respectively comprise twenty-four optical paths arranged in two rows of twelve optical paths having positions 1 to 24, and the optical fibers comprising the logical channels are terminated in a subset of the twenty-four optical paths having positions 2 to 11 and 14 to 23 respectively of the positions 1 to 24, and wherein another subset of the twenty-four optical paths having positions 1, 12, 13, and 24 of the positions 1 to 24 are inactive.

14. The multi-fiber interconnection module of claim 8, wherein the twelve fiber optical connector comprises twelve optical paths arranged in one row of twelve optical paths having positions 1 to 12, and the optical fibers comprising the logical channels are in a subset of the twelve optical paths having positions 1 to 4 and 9 to 12 of the positions 1 to 12, respectively, and wherein another subset of the twelve optical paths having positions 5 to 8 of the positions 1 to 12 are inactive.

15. A method, comprising:
installing a first end of a cable comprising a plurality of optical fibers to a plurality of optical paths related to a first multi-fiber optical connector and a second multi-fiber optical connector, wherein the plurality of optical paths are active; and installing a second end of the cable comprising the plurality of optical fibers to a set of multi-fiber optical connectors, wherein a sum of optical paths of the set of multi-fiber optical connectors is greater than the plurality of optical paths related to the first multi-fiber optical connector and the second multi-fiber optical connector, and wherein the set of multi-fiber optical connectors comprises two twenty-four fiber optical connectors respectively comprising twenty active optical paths and a twelve fiber optical connector comprising eight active optical paths.

16. The method of claim 15, further comprising:
designating a first portion of the plurality of optical paths as transmit channels and a second equal portion of the plurality of optical paths as receive channels.

17. The method of claim 16, further comprising:
designating a first portion of the sum of the optical paths of the set of multi-fiber optical connecters as transmit channels and a second portion of the set of multi-fiber optical connecters equal to the first portion as receive channels.

18. The method of claim 17, wherein the installing the set of multi-fiber optical connectors to the second end of the cable comprising the plurality of optical fibers results in respective multi-fiber optical connectors of the set of multi-fiber optical connectors having at least one empty optical paths.

19. The method of claim 15, wherein the installing the first end comprises installing in the first multi-fiber optical connector and the second multi-fiber optical connector respectively comprising twenty-four optical paths arranged in two rows of twelve first optical paths, respective optical paths of the twenty-four first optical paths having disposed therein a respective optical fiber of the plurality of optical fibers.

20. The method of claim 15, wherein the installing the second end comprises installing in the two twenty-four fiber optical connectors respectively comprising twenty-four optical paths arranged in two rows of twelve optical paths having positions 1 to 24, wherein a subset of the plurality of optical fibers are terminated in a subset of the twenty-four optical paths having positions 2 to 11 and 14 to 23, respectively, of the positions 1 to 24, and wherein another subset of the twenty-four optical paths having positions 1, 12, 13, and 24 of the positions 1 to 24 are inactive.

* * * * *